(12) United States Patent
Moll

(10) Patent No.: US 9,751,735 B2
(45) Date of Patent: Sep. 5, 2017

(54) FLUIDICALLY ACTUATABLE FAILSAFE DISK BRAKE SYSTEM AND LIFTING DEVICE COMPRISING SAID SYSTEM

(71) Applicant: MHWIRTH GMBH, Erkelenz (DE)

(72) Inventor: Roland Moll, Heinsberg (DE)

(73) Assignee: MHWIRTH GMBH, Erkelenz (DE)

( * ) Notice: Subject to any disclaimer, the term of this patent is extended or adjusted under 35 U.S.C. 154(b) by 0 days.

(21) Appl. No.: 15/115,267

(22) PCT Filed: Jan. 19, 2015

(86) PCT No.: PCT/EP2015/050868
§ 371 (c)(1),
(2) Date: Jul. 29, 2016

(87) PCT Pub. No.: WO2015/113847
PCT Pub. Date: Aug. 6, 2015

(65) Prior Publication Data
US 2017/0001845 A1    Jan. 5, 2017

(30) Foreign Application Priority Data
Jan. 30, 2014   (DE) .................. 10 2014 101 128

(51) Int. Cl.
*B66D 5/14*    (2006.01)
*B66D 5/26*    (2006.01)
(Continued)

(52) U.S. Cl.
CPC ................. *B66D 5/14* (2013.01); *B66D 5/26* (2013.01); *B66D 5/28* (2013.01); *F16D 55/22* (2013.01);
(Continued)

(58) Field of Classification Search
CPC ......... B60T 13/22; B60T 15/028; B66D 5/14; B66D 5/26; B66D 5/28; F16D 55/22; F16D 59/02; F16D 2048/0257; F16D 2500/1027
(Continued)

(56) References Cited

U.S. PATENT DOCUMENTS 5,895,099 A * 4/1999 Diecke .................... B60T 13/22
180/306
7,232,113 B2 * 6/2007 Heinrichs ................ B66D 5/14
254/342

(Continued)

FOREIGN PATENT DOCUMENTS

CN    102701103 A    10/2012
DE    32 04 695 A1    8/1983
(Continued)

*Primary Examiner* — Thomas Irvin
(74) *Attorney, Agent, or Firm* — Norman B. Thot

(57) ABSTRACT

A fluidically actuatable disk brake system includes brake cylinder pairs each including brake cylinders arranged on both sides of a brake disk in at least one brake caliper. Each brake cylinder includes a brake piston and a spring arrangement which applies a spring force toward the brake disk. First and second fluid connections are provided on the brake cylinder. The first and second fluid connections supply a fluid to the brake cylinder so that a force counteracting the spring force is applied to the brake piston. A 2/2-way valve is assigned either to the first or second fluid connection of first brake cylinders of a brake cylinder pair. The first or second fluid connection which is not assigned to the 2/2-way valve is fluidically connected to the respective other first or second fluid connection of a second brake cylinder of the brake cylinder pair.

7 Claims, 3 Drawing Sheets

(51) Int. Cl.
  *B66D 5/28* (2006.01)
  *F16D 55/22* (2006.01)
  *B60T 13/22* (2006.01)
  *B60T 15/02* (2006.01)
  *F16D 59/02* (2006.01)

(52) U.S. Cl.
  CPC ............ *B60T 13/22* (2013.01); *B60T 15/028* (2013.01); *F16D 59/02* (2013.01)

(58) Field of Classification Search
  USPC .................................................. 303/71, 9.76
  See application file for complete search history.

(56) References Cited

U.S. PATENT DOCUMENTS

| | | | |
|---|---|---|---|
| 7,896,315 B2* | 3/2011 | Faust ...................... | B66D 1/26 254/275 |
| 2005/0133773 A1 | 6/2005 | Heinrichs et al. | |
| 2008/0223035 A1 | 9/2008 | Smith et al. | |
| 2010/0206831 A1 | 8/2010 | Faust | |
| 2015/0191328 A1* | 7/2015 | Strbuncelj ................ | B66D 5/14 187/254 |
| 2016/0167937 A1* | 6/2016 | Kueppers ................ | B66D 5/14 188/151 R |

FOREIGN PATENT DOCUMENTS

| | | |
|---|---|---|
| DE | 36 04 451 A1 | 8/1987 |
| DE | 10 2006 003 832 A1 | 8/2007 |
| DE | 10 2007 041 411 B3 | 1/2009 |
| SU | 787349 A2 | 12/1980 |
| WO | WO 03/072904 A1 | 9/2003 |
| WO | WO 2007/012877 A1 | 2/2007 |

\* cited by examiner

US 9,751,735 B2

FLUIDICALLY ACTUATABLE FAILSAFE DISK BRAKE SYSTEM AND LIFTING DEVICE COMPRISING SAID SYSTEM

CROSS REFERENCE TO PRIOR APPLICATIONS

This application is a U.S. National Phase application under 35 U.S.C. §371 of International Application No. PCT/EP2015/050868, filed on Jan. 19, 2015 and which claims benefit to German Patent Application No. 10 2014 101 128.7, filed on Jan. 30, 2014. The International Application was published in German on Aug. 6, 2015 as WO 2015/113847 A1 under PCT Article 21(2).

FIELD

The present invention relates to a fluidically actuatable disk brake system, in particular for a lifting device, having a plurality of brake cylinder pairs, each having brake cylinders arranged on both sides of a brake disk in one or more brake calipers, wherein each brake cylinder comprises a brake piston to which a spring force directed toward the brake disk is applied by a spring arrangement, a first fluid connection and a second fluid connection being provided on each brake cylinder, through which a fluid can be supplied to the brake cylinder, to enable a force directed against the spring force to be applied to the brake piston to reduce the braking force induced by the spring force.

BACKGROUND

The term "fluidically" is in particular understood to mean hydraulically or pneumatically. The term "fluid" is accordingly understood to in particular refer to a hydraulic fluid or to compressed air.

Such a disk brake system is referred to as "fail safe" because, in the worst case, what is expected in the event of a defect is a decline in the fluid pressure applied to the brake cylinders. This leads to brake activation and thus prevents an uncontrolled state of movement. This is described, for example, in DE 10 2007 041 411 B3, DE 10 2006 003 832 A1, DE 36 04 451 A1 and DE 32 04 695 A1.

A lifting device having such a disk brake system is described, for example, in WO 03/072904 A1. This lifting device serves to increase and decrease a load, in particular with drilling equipment or a pipe plugging closing device, for example, from a floating platform on the bottom of the ocean or in or on a borehole. It has a rotatably mounted winding drum which is attached to a flexible traction device, which is usually made of a steel cable that can be wound and unwound by a rotational drive of the winding drum. The winding drum is connected to a brake disk of the disk brake system. The rotational speed of the winding drum can be decreased or even completely blocked during the unwinding operation with the help of the brake cylinder pairs that are provided with a plurality of brake calipers.

To be able to influence the braking force, the pressure applied to each brake cylinder must be adjusted in the same way, to which end, in the simplest case, the first and second fluid connections of all brake cylinders must merely be connected in parallel with the same fluid pressure source.

Safety regulations require, however, that, for testing purposes, the brake cylinder pairs must be activatable or deactivatable either individually or jointly in various combinations. To do so with known disk brake system, the first fluid connections of the two brake cylinders of a brake cylinder pair must be connected to a first pressure line, while the two second fluid connections must be connected to a second pressure line. Each pressure line comprises a separate 2/2-way valve which can be operated electromagnetically against a spring force. The 2/2-way valve is designed so that it is also currentless in the forward-voltage position under the influence of the spring force.

One disadvantage with such a disk brake system is the installation cost associated with the individual 2/2-way valves. Operational reliability is also negatively influenced by any leakage which may occur in the fluid lines between the 2/2-way valves and the brake cylinders.

SUMMARY

An aspect of the present invention is to provide a disk brake system that is improved with respect to the above disadvantages.

In an embodiment, the present invention provides a fluidically actuatable disk brake system which includes a plurality of brake cylinder pairs each comprising brake cylinders arranged on both sides of a brake disk in at least one brake caliper. Each of the brake cylinders comprise a brake piston and a spring arrangement. The spring arrangement is configured to apply a spring force toward the brake disk. A first fluid connection and a second fluid connection are provided on each of the brake cylinders. The first fluid connection and the second fluid connection are configured to supply a fluid to the brake cylinder so that a force which counteracts the spring force can be applied to the brake piston to reduce a braking force exerted by the spring force. A 2/2-way valve is assigned either to the first fluid connection or to the second fluid connections of a first brake cylinder of a first brake cylinder pair. A 2/2-way valve is assigned either to the first fluid connection or to the second fluid connections of a second brake cylinder of the first brake cylinder pair. If the first fluid connection of the first brake cylinder of the first brake cylinder pair is assigned to the 2/2-way valve, the second fluid connection of the first brake cylinder of the first brake cylinder pair is fluidically connected to the first fluid connection of the second brake cylinder of the first brake cylinder pair. If the second fluid connection of the first brake cylinder of the first brake cylinder pair is assigned to the 2/2-way valve, the first fluid connection of the first brake cylinder of the first brake cylinder pair is fluidically connected to the second fluid connection of the second brake cylinder of the first brake cylinder pair.

BRIEF DESCRIPTION OF THE DRAWINGS

The present invention is described in greater detail below on the basis of embodiments and of the drawings in which.

DETAILED DESCRIPTION

In an embodiment of the disk brake system according to the present invention, a 2/2-way valve is assigned to each one of the first or second fluid connections of the brake cylinder of the brake cylinder pair, and the other one of the first or second fluid connections of the brake cylinder of the brake cylinder pair is connected to the others fluidically. In other words, the brake cylinders of a brake cylinder pair are connected in series fluidically, wherein a 2/2-way valve is inserted into each one of the inlet lines to the fluid pressure source.

It is thereby possible to design the 2/2-way valves as cartridge valves, also known as "screw-in valves," arranged in or on the brake caliper. Each brake caliper therefore requires only one single cartridge valve per brake cylinder based on the series connection of the brake cylinders in order to separate the brake cylinder pair optionally from the fluid source or to connect it to the fluid source, whereas four cartridge valves would be required in the case of the fluidic parallel connection of the brake cylinders of a brake cylinder pair, namely, one cartridge valve on each fluid connection of the brake cylinders.

The brake system according to the present invention is therefore characterized by a reduced installation complexity. The risk of leakage can be reduced by the option of designing the brake system as cartridge valves. The installation space required by the disk brake system is also reduced by the use of cartridge valves.

If the 2/2-way valves are designed as motor-operated valves that can be brought into the closed position against the spring force, these must then be acted upon by electric power only for test purposes so that power consumption is reduced to the normal range and operating reliability is increased.

To be able to detect the efficacy of individual groups of brake cylinder pairs or several different groups of brake cylinder pairs, an embodiment of the present invention provides that the 2/2-way valves of one brake cylinder pair can, for example, be designed independently of the 2/2-way valves of the other brake cylinder pairs or, optionally, together with one or more of the other brake cylinder pairs.

The brake system according to the present invention is provided for a lifting device of the type in particular described above. The present invention therefore also relates to a lifting device equipped with such a brake system.

The present invention will be illustrated in greater detail below on the basis of the drawings.

Figure 1:
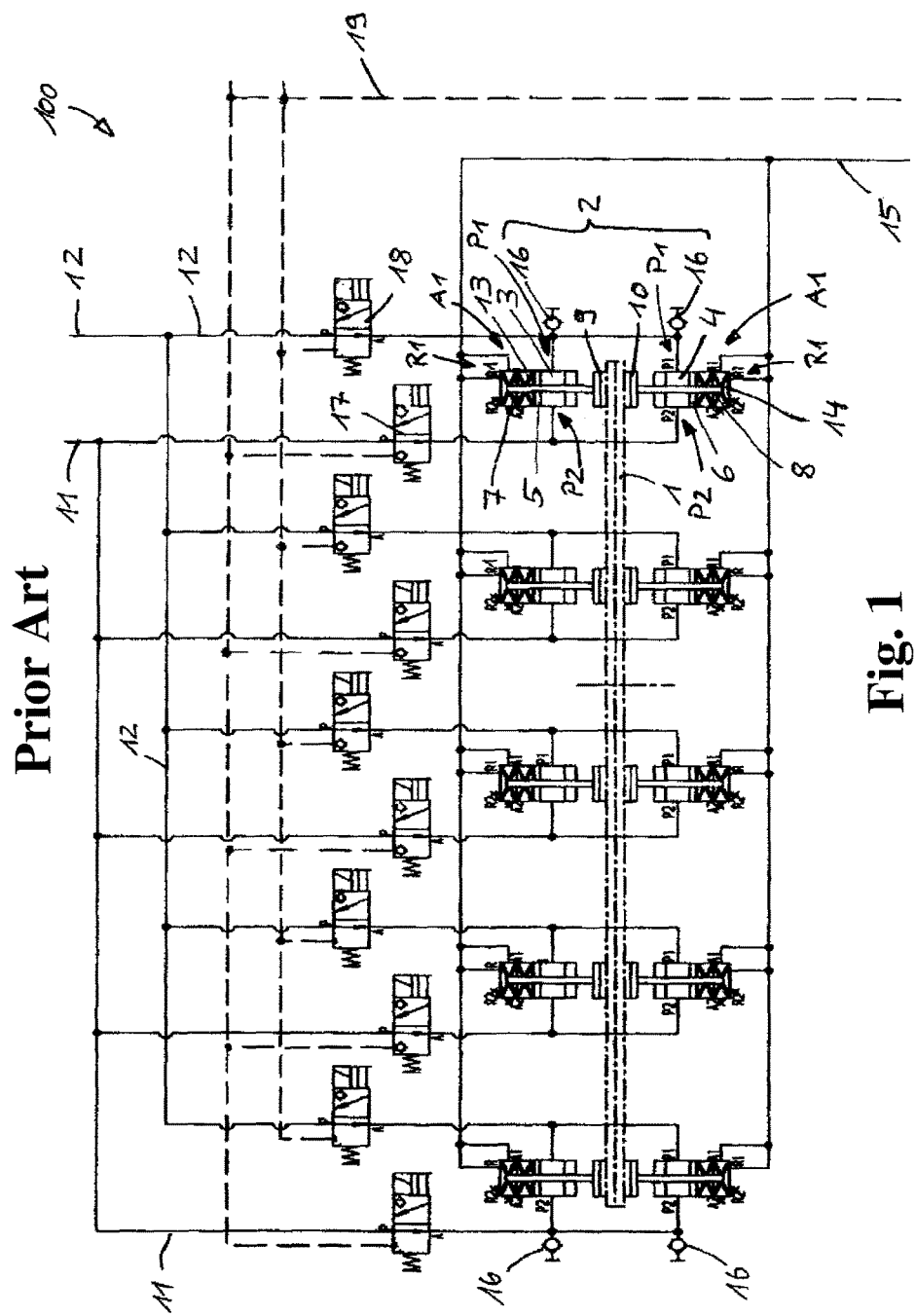
FIG. 1 shows a schematic diagram of the hydraulics of an exemplary embodiment of a disk brake system belonging to the state of the art.

The exemplary embodiment of a disk brake system 100 belonging to the state of the art, as illustrated in FIG. 1, comprises a brake disk 1 as well as five brake cylinder pairs 2, having brake cylinders 3, 4 arranged opposite one another on both sides of a brake disk. Each brake cylinder 3, 4 consists of a single-acting brake piston 5, 6.

A spring arrangement 7, 8 acts on each brake piston 5, 6 and exerts a spring force on the brake piston, directed toward the brake disk 1.

Each brake piston 5, 6 acts on a brake lining 9, 10, which is pressed against the brake disk 1 under a spring force, thereby inducing the braking effect.

To reduce the braking effect, each brake cylinder 3, 4 has a first fluid connection P1 and a second fluid connection P2. Each fluid connection P1, P2 is connected to a pressure line 11, 12 so that a fluid pressure, for example, hydraulic pressure, which is supplied via the pressure lines 11, 12 is applied to the brake piston 5, 6, and a force is exerted on the respective brake piston 5, 6, and thus on the respective brake lining 9, 10, by the respective spring arrangement 7, 8.

To enable an exchange of air between the chambers 13, 14 (enclosing the spring arrangements 7, 8) of the brake cylinders 3, 4 and the surroundings, each chamber 13, 14 has a connection A1 for venting and aerating. A connection R1, which serves to remove any leakage fluid that might have passed through the respective brake piston 5, 6, is also provided on each chamber 13, 14. The connections A1, R1 are connected to a line system 15 in the shown embodiment.

Ventilation valves 16, which serve to release air after the operation of filling with hydraulic fluid in the event of hydraulic operation, are activated in the pressure lines 11, 12 on the two outer brake cylinder pairs.

In order for each of the brake cylinder pairs 2 to be optionally subject to the fluid pressure supplied through the pressure lines 11, 12 separately from one another or to be separable from the pressure lines for testing purposes, a 2/2-way valve 17, 18 is connected to each of the pressure lines 11, 12 for each of the brake cylinder pairs 2. The 2/2-way valve is designed to be electromagnetically operable against the action of a spring force so that it is switched to the open position in the currentless state. To uncouple a brake cylinder pair 2 from the pressure lines 11, 12, the respective 2/2-way valves 17, 18 must be activated by an electric current so that the brake cylinder pair 2 can be held under the fluid pressure prevailing at the point in time of operation of the 2/2-way valves 17, 18 independently of a subsequent change in pressure applied to the pressure lines 11, 12.

In order for any leakage fluid not to escape uncontrollably from the 2/2-way valves 17, 18, each of the valves is connected to a leakage line 19.

The exemplary embodiment of the brake system according to the present invention illustrated in FIG. 2 differs from the brake system which is illustrated in FIG. 1 and to whose description above reference is herewith made unless described otherwise below. The difference consists of the fact that the first fluid connection P1 of one of the brake cylinders of the brake cylinder pairs 2, i.e., the brake cylinder 4, is here connected to the pressure line 12, whereas the second fluid connection P2 is connected to the first fluid connection P1 of the other brake cylinder of this brake cylinder pair, i.e., here the brake cylinder 3, and a second fluid connection P2 of this brake cylinder 3 is connected to the pressure line 11. Due to this fluidic series connection, the same functionality can be achieved as with the exemplary embodiment according to the state of the art, but in this case, only two 2/2-way valves designed as cartridge valves are necessary to achieve this functionality, wherein the one cartridge valve 20 is provided for optional isolation of the first fluid connection P1 from the pressure line 12 on the brake cylinder 4, whereas the second cartridge valve 21 is provided for optional separation of a second fluid connection P2 of the brake cylinder 3 from the pressure line 11 on the brake cylinder 3. The cartridge valves 20, 21 are designed functionally in accordance with the 2/2-way valves 17, 18.

Figure 2:
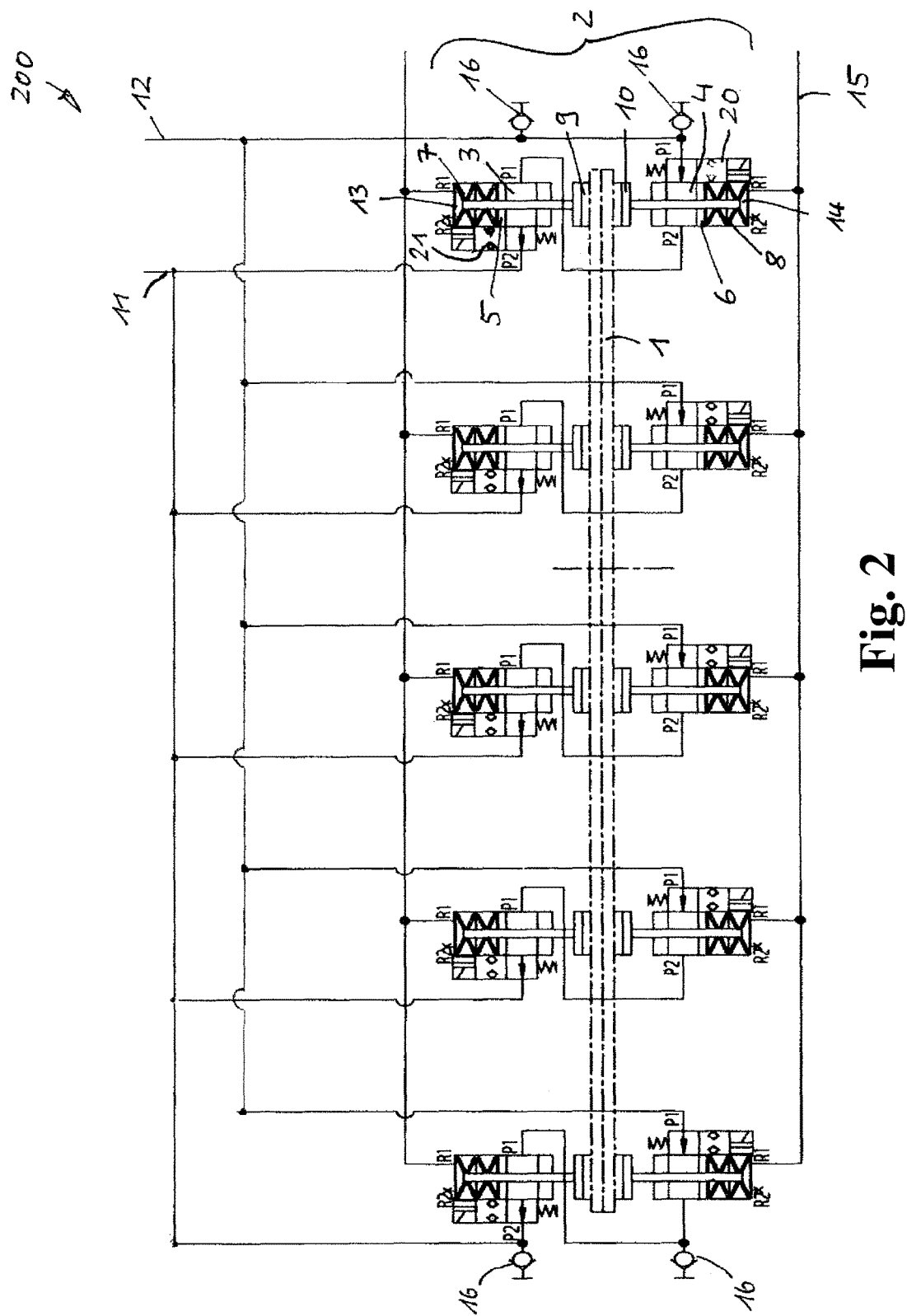
FIG. 2 shows a schematic diagram of the hydraulics of an exemplary embodiment of the disk brake system according to the present invention.

As in the embodiment of the disk brake system 100 according to the state of the art, the embodiment of the disk brake system 200 according to the present invention, as shown in FIG. 2, has ventilation valves 16 as well as a ventilation system 15, but the connections R1 for removing leakage fluid are connected to this ventilation system in the exemplary embodiment here shown.

Figure 3:
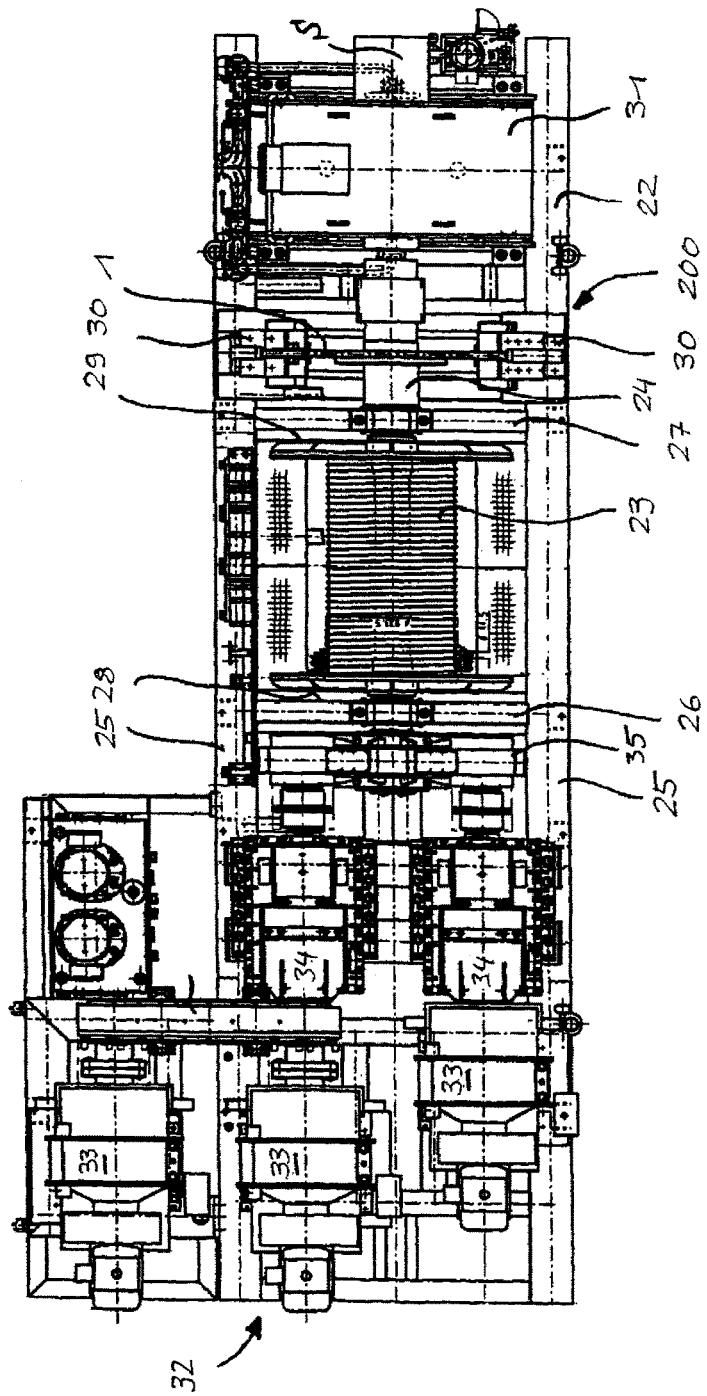
FIG. 3 shows an exemplary embodiment of a lifting device for which the disk brake system according to the present invention is provided.

A disk brake system 200 according to the present invention is provided in particular for use in a lifting device, which may be designed, for example, as shown in FIG. 3.

The components of the lifting device are mounted on a frame 22. For increasing and decreasing as well as maintaining a load, in particular for a drawing machine or the like, a drum 23, which is mounted on a drum shaft 24, so that it is rotationally fixed and whose axis S runs parallel to the longitudinal sides 25 of the frame 22, is provided. The drum 23 is mounted in bearing blocks 26, 27 which are arranged on the far side of the two end faces 28, 29 of the drum 23.

In the region of the drum shaft 24 shown at the right of the drum 23 in FIG. 1, the brake disk 1, which is part of the disk brake system 200, is arranged in a rotationally fixed manner. The brake cylinder pairs 2 of this disk brake system are arranged in several brake calipers 30 in the exemplary embodiment shown in FIG. 3, only two of these brake calipers being visible in FIG. 3.

An eddy current brake 31, which is also connected to the drum shaft 24, is also provided to support the disk brake system 200 in decelerating an unwinding operation.

A drive unit 32 is provided on the left of the drum 23 according to FIG. 1, the drive unit 32 comprising electrically driven drive motors 33 and gear units 34 as well as a pick-off gear 35 in the case of the exemplary embodiment not shown here.

The present invention is not limited to embodiments described herein; reference should be had to the appended claims.

LIST OF REFERENCE NUMERALS 100, 200 Disk brake system
1 Brake disk
2 Brake cylinder pairs
3 Brake cylinder
4 Brake cylinder
5 Brake piston
6 Brake piston
7 Spring arrangement
8 Spring arrangement
9 Brake lining
10 Brake lining
11 Pressure line
12 Pressure line
13 Chamber
14 Chamber
15 Line system/Ventilation system
16 Ventilation valves
17 2/2-way valve
18 2/2-way valve
19 Leakage line
20 Cartridge valve
21 Cartridge valve
22 Frame
23 Drum
24 Drum shaft
25 Longitudinal sides
26 Bearing block
27 Bearing block
28 End face
29 End face
30 Brake calipers
31 Eddy current brake
32 Drive unit
33 Drive motors
34 Gear units
35 Pick-off gear
A1 Connection
P1 First fluid connection
P2 Second fluid connection
R1 Connection
S Axis

What is claimed is:

1. A fluidically actuatable disk brake system comprising:
a plurality of brake cylinder pairs each comprising brake cylinders arranged on both sides of a brake disk in at least one brake caliper,
wherein,
each of the brake cylinders comprise a brake piston and a spring arrangement, the spring arrangement being configured to apply a spring force toward the brake disk,
a first fluid connection and a second fluid connection are provided on each of the brake cylinders, the first fluid connection and the second fluid connection being configured to supply a fluid to the brake cylinder so that a force which counteracts the spring force can be applied to the brake piston to reduce a braking force exerted by the spring force,
a 2/2-way valve is assigned either to the first fluid connection or to the second fluid connections of a first brake cylinder of a first brake cylinder pair,
a 2/2-way valve is assigned either to the first fluid connection or to the second fluid connections of a second brake cylinder of the first brake cylinder pair,
if the first fluid connection of the first brake cylinder of the first brake cylinder pair is assigned to the 2/2-way valve, the second fluid connection of the first brake cylinder of the first brake cylinder pair is fluidically connected to the first fluid connection of the second brake cylinder of the first brake cylinder pair, and
if the second fluid connection of the first brake cylinder of the first brake cylinder pair is assigned to the 2/2-way valve, the first fluid connection of the first brake cylinder of the first brake cylinder pair is fluidically connected to the second fluid connection of the second brake cylinder of the first brake cylinder pair.

2. The disk brake system as recited in claim 1, wherein each 2/2-way valve is designed as a cartridge valve arranged in or on the at least one brake caliper.

3. The disk brake system as recited in claim 1, wherein each 2/2-way valve is designed as a motor operable valve which can be brought into a closed position against the spring force.

4. The disk brake system as recited in claim 3, wherein each 2/2-way valve is designed to be electromagnetically operable.

5. The disk brake system as recited in claim 3, wherein the first brake cylinder pair comprises two 2/2 way valves each of which is configured to operate independently of 2/2-way valves of an at least one second brake cylinder pair.

6. The disk brake system as recited in claim 5, wherein each of the two 2/2-way valves of the first brake cylinder pair is further configured to alternatively operate together with the 2/2-way valves of the at least one second brake cylinder pair.

7. A lifting device comprising the brake system as recited in claim 1.

* * * * *